Figure 3:
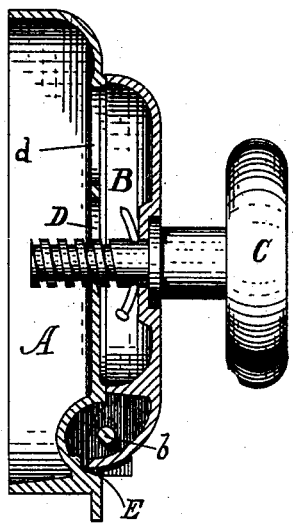

(No Model.) 2 Sheets—Sheet 1.
W. J. KEEP & W. V. ROBINSON.
STOVE DAMPER.
No. 600,080. Patented Mar. 1, 1898.
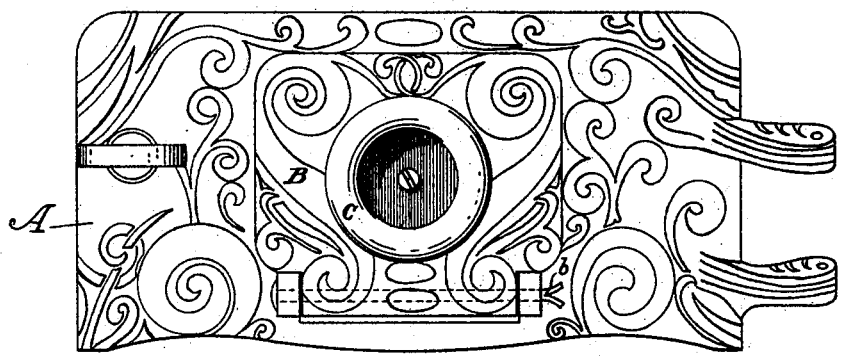
Fig-1-
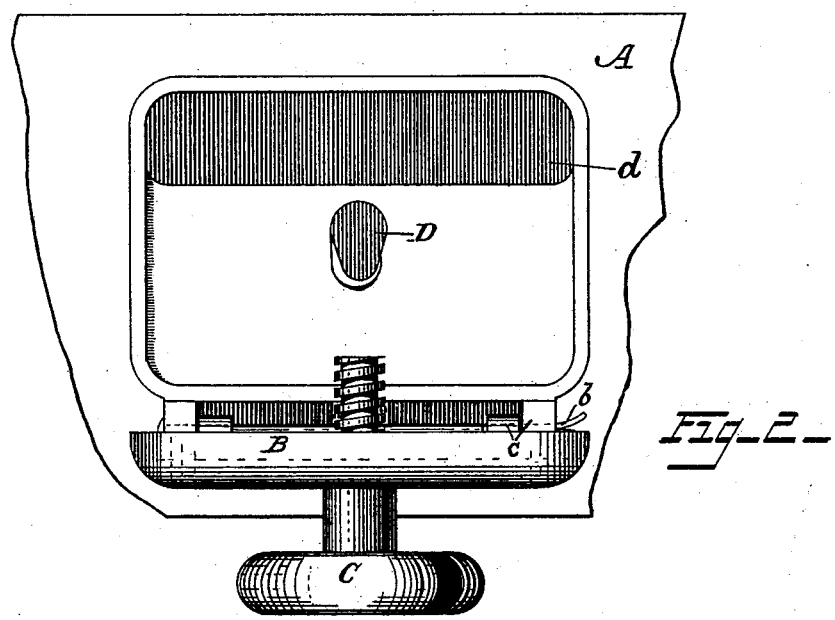
Fig-2-
Witnesses:
Inventors (No Model.) 2 Sheets—Sheet 2.

W. J. KEEP & W. V. ROBINSON.
STOVE DAMPER.

No. 600,080. Patented Mar. 1, 1898.

Witnesses:
Aurelia Williams
David T. Marantette

Inventors
William J. Keep
William V. Robinson
by Cyrus E. Lothrop
Attorney.

UNITED STATES PATENT OFFICE.

WILLIAM J. KEEP AND WILLIAM V. ROBINSON, OF DETROIT, MICHIGAN, ASSIGNORS TO THE MICHIGAN STOVE COMPANY, OF SAME PLACE.

STOVE-DAMPER.

SPECIFICATION forming part of Letters Patent No. 600,080, dated March 1, 1898.

Application filed July 29, 1897. Serial No. 646,376. (No model.)

*To all whom it may concern:*

Be it known that we, WILLIAM J. KEEP and WILLIAM V. ROBINSON, of Detroit, in the county of Wayne and State of Michigan, have invented a new and useful Improvement in Stove-Dampers, of which the following is a specification.

Our invention relates to that class of dampers which are provided with screws or other similar devices for the more accurate control and adjustment of the opening and closing thereof; and it consists generally of a device which while provided with a screw-gear or other equivalent means for accurately controlling the opening and closing of the damper will also permit of the damper's being opened readily to its fullest extent, so that free access may be had to that part of the stove or apparatus to which the damper is attached, ordinarily covered by the damper when closed.

Previous to our invention several forms of dampers have been made or used the opening or closing of which was regulated by screws or other mechanical devices, and we do not broadly claim a damper the opening or closing of which is so controlled, but to our knowledge no such dampers have been made in such manner that free and uninterrupted access could be had readily to the parts covered by the damper when closed. By the use of our invention, however, while the opening and closing of the damper may be accurately controlled when desirable by the screw or other equivalent means provided for the purpose the damper may also be readily and conveniently thrown wide open and free and perfect access afforded to the parts covered by it when closed for any purposes desired. This we effect by providing a means whereby the screw or other device used for accurately controlling the opening or closing of the damper may be readily disengaged and thrown out of gear, so that the damper may be opened to the fullest extent possible as readily as if the controlling device had not been attached.

The damper is shown pivoted with a rod, but any other equivalent means to permit it to turn on its edge may be used.

In the accompanying drawings we have shown one form of our device and the one which we believe to be generally preferable, although the form and details of operation may be considerably varied, if desired.

In the drawings our damper is shown attached to the door opening into the ash-pit of a stove or other heating apparatus, although it is obvious that it may be attached to any desired part of an apparatus.

Figure 5:
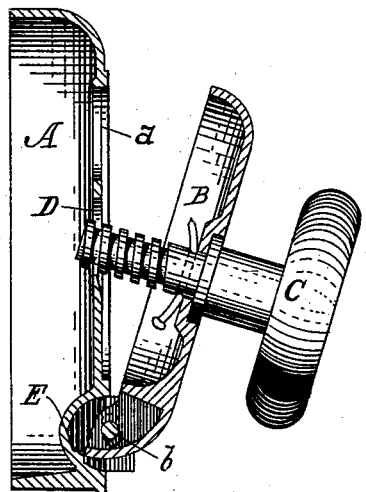
Figure 4:
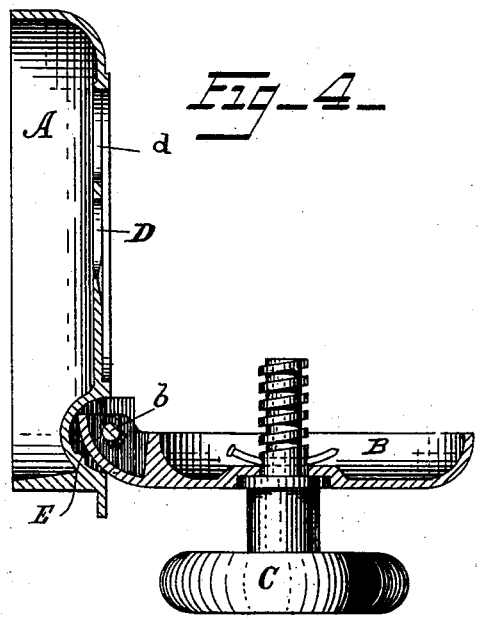

Figure 1 represents a front view of the ash-pit door with the damper closed. Fig. 2 is a front view of a portion of the door with the damper thrown completely open. Fig. 3 is a cross-section through the door and damper, the latter being closed, as in Fig. 1. Fig. 4 is a similar cross-section, the damper being thrown wide open, as in Fig. 2; and Fig. 5 is a similar cross-section, the damper being shown partially opened and held in position by the controlling-screw.

In the several drawings, A represents the door; B, the damper, pivoted upon its lower edge upon the hinge or pivot *c;* *b,* a rod passing through and turning freely in a hole in the damper; D, an opening in that part of the door covered by the damper when closed, through which the threaded end of the rod C passes; *d,* another opening in the part of the door covered by the damper when closed for the purposes of admitting air and of affording access to the interior of the heating apparatus for shaking the grate or other desired purposes, which opening is shown in the drawings as having a straight horizontal lower edge for a shaker to slide upon; and E represents a lug formed upon the recess in the door in which the lower edge of the damper turns, so arranged as to prevent the damper being opened beyond a certain width unless lifted clear of the lug, as hereinafter explained.

The opening D should be made so that while the threads of the screw C will engage with its edge and thereby control the operation of the damper when so desired the screw can be thrown clear of the edge and readily withdrawn when it is desired to permit of the free opening of the damper. The form of opening shown in the drawings we regard as the preferable one.

While it is obvious that means can be provided for disengaging the screw from the edge of the opening D by providing for the movement of the screw-rod in the opening through the damper-plate in the desired direction, we regard it as preferable, for obvious reasons, that the screw-rod be so fixed as to allow only a rotary motion, as shown in the drawings, and that provision be made for lifting the damper itself with the screw, so as to disengage the latter, this being permitted in the device shown in the drawings by enlarging the holes in the damper through which the pivot-rod *b* passes, so as to allow the necessary play, or by any other suitable device or means. The provision for lifting the damper until the screw is disengaged also provides the means for enabling the lower edge of the damper to clear the lug E, which would otherwise prevent the damper from being opened beyond a certain point. Other openings in the part covered by the damper may be made for the purpose of admitting a large quantity of air or other desired purposes. It is readily apparent that our invention may be applied to a damper pivoted at the upper edge or at one side, or that some equivalent for the screw-rod shown in the drawings may be employed to regulate the opening and closing of the damper, and we do not desire to be understood as limiting ourselves to the specific form of device shown in the drawings, nor, although we have spoken of our damper hitherto in connection with stoves or other heating apparatus, do we desire to limit ourselves to its use therewith, it being obvious that it may be used or employed in any apparatus where a damper or regulator of that nature is desired.

The operation of the form of our device shown in the drawings is as follows: The damper being closed and the threads of the screw C being engaged with the lower edge of the opening D, as shown in Fig. 3, the damper may be opened to any desired degree up to the point where the lower edge comes into contact with the lug E by turning the handle of the screw-rod C in the proper direction, and when so opened can be closed to any desired degree by turning the handle in the opposite direction. It will be readily seen that the purpose of the lug E is to prevent the damper being opened so far by the turning of the screw as to turn the latter clear of the edge of the opening D, thereby allowing the damper to swing entirely open. In case it is desired to open the damper to its fullest extent, as shown in Figs. 2 and 4, the damper is lifted up, thereby disengaging the screw from the edge of the opening D and allowing the lower edge of the damper to clear the lug E and the damper allowed to fall back. In case it is desired to rapidly adjust the damper to any position between those shown in Figs. 3 and 5, it may be done without turning the screw, by lifting the damper until the screw is disengaged, and opening or closing it to the desired extent.

Having thus described its operation, what we claim as our invention, and desire to secure by Letters Patent, is—

1. In combination with a casing having an opening, a damper hinged thereto having a regulating device engaging an edge of the opening and means for lifting the regulating device bodily from engagement with the opening whereby to permit the damper to be readily closed or opened to its fullest extent, substantially as described.

2. In combination with a casing having an opening, a damper hinged thereto having a screw, or similar device, engaging an edge of said opening to open and close the damper, and a lug on said casing adapted to limit the outward movement of the damper to prevent the screw from being turned out of engagement with the edge of said opening, substantially as described.

3. In combination with a casing having an elongated opening a damper hinged to said casing and vertically movable relative thereto, and a screw, or similar device, carried by said damper and adapted to engage an edge of said opening, substantially as described.

4. In combination with a casing having an elongated opening, a damper slidably hinged to said casing and vertically movable relative thereto, a screw carried by said damper adapted to engage one edge of said opening, and a lug on the casing adapted to engage the bottom of the damper in the outward movement thereof, substantially as described.

WILLIAM J. KEEP.
WILLIAM V. ROBINSON.

Witnesses:
FRANK A. JEFFREY,
HENRY BOYES.